United States Patent
Kusche

(10) Patent No.: US 10,113,129 B2
(45) Date of Patent: Oct. 30, 2018

(54) APPARATUS FOR CONDUCTING A HYDROTHERMAL CARBONIZATION REACTION

(71) Applicant: AVA Green Chemistry Development GmbH, Murchin-Relzow (DE)

(72) Inventor: Stepan Nicolja Kusche, Bad Schoenborn (DE)

(73) Assignee: AVA Green Chemistry Development GmbH, Murchin-Relzow (DE)

( * ) Notice: Subject to any disclaimer, the term of this patent is extended or adjusted under 35 U.S.C. 154(b) by 0 days.

(21) Appl. No.: 15/596,579

(22) Filed: May 16, 2017

(65) Prior Publication Data

US 2018/0258360 A1    Sep. 13, 2018

(30) Foreign Application Priority Data

Mar. 10, 2017 (EP) .................................. 17160428

(51) Int. Cl.
    *C10L 9/08*      (2006.01)
    *B01J 19/24*     (2006.01)

(52) U.S. Cl.
    CPC .............. *C10L 9/086* (2013.01); *B01J 19/24* (2013.01); *B01J 2219/00087* (2013.01);
    (Continued)

(58) Field of Classification Search
    CPC . C10L 19/086; B01J 19/24; B01J 2219/0074; B01J 2219/00087; B01J 2219/00159
    See application file for complete search history.

(56) References Cited

U.S. PATENT DOCUMENTS

| | | | |
|---|---|---|---|
| 6,955,793 B1 * | 10/2005 | Arencibia, Jr. | B01F 7/1675 165/169 |
| 8,043,505 B2 * | 10/2011 | Noguchi | B01D 65/08 210/257.2 |

(Continued)

FOREIGN PATENT DOCUMENTS

| CN | 105264048 A | 1/2016 |
|---|---|---|
| DE | 10 2010 044 200 A1 | 1/2012 |

(Continued)

OTHER PUBLICATIONS

Brockhaus, Encyclopedia, in 30 volumes; 21st edition of 2006, total of 3 pages (with English translation of relevant term).

*Primary Examiner* — Lessanework Seifu
(74) *Attorney, Agent, or Firm* — Collard & Roe, P.C.

(57) ABSTRACT

During hydrothermal carbonization, the carbonization reaction takes place in a reaction tank, at high pressure and high temperature, and with steam feed. Because reactor charging takes place using a batch method, the biomass should be kept on hand in a pulper beforehand, and heated there. Slurry that leaves the reactor, in contrast, subsequently should be cooled in a buffer tank. For this purpose, cooling of the slurry and pre-heating of the biomass are linked. For this purpose, a heat exchanger in the pulper and a further heat exchanger in the buffer tank, which are connected to form a heat circuit, are supposed to be kept on hand. In this way, the slurry to be cooled can give off its heat to the biomass to be heated up, with the effect that significantly less energy leaves the system and has to be supplied to it again at a different location.

11 Claims, 2 Drawing Sheets

(52) U.S. Cl.
CPC . *B01J 2219/00159* (2013.01); *C10L 2290/06* (2013.01); *C10L 2290/24* (2013.01)

(56) References Cited

U.S. PATENT DOCUMENTS

| | | | |
|---|---|---|---|
| 8,597,431 B2* | 12/2013 | McDonald | C13K 1/02 127/1 |
| 2006/0096163 A1 | 5/2006 | Dickinson et al. | |
| 2010/0162619 A1 | 7/2010 | Peus | |
| 2012/0042566 A1 | 2/2012 | Mackintosh | |
| 2015/0368104 A1 | 12/2015 | Vyskocil et al. | |

FOREIGN PATENT DOCUMENTS

| | | |
|---|---|---|
| DE | 10 2011 001 108 A1 | 9/2012 |
| DE | 10 2011 001 954 A1 | 10/2012 |
| WO | 2013/079063 A1 | 6/2013 |

* cited by examiner

APPARATUS FOR CONDUCTING A HYDROTHERMAL CARBONIZATION REACTION

CROSS REFERENCE TO RELATED APPLICATIONS

Applicant claims priority under 35 U.S.C. § 119 of European Application No. 17160428.3 filed Mar. 10, 2017, the disclosure of which is incorporated by reference.

BACKGROUND OF THE INVENTION

1. Field of the Invention

The present invention relates to an apparatus for conducting a hydrothermal carbonization reaction. More particularly, the apparatus includes a reaction tank, which is connected with a steam generator to receive hot steam, and connected with a mixing tank to receive biomass, by way of a feed pipe, and which is connected with a buffer tank to drain off a slurry that forms in the reaction tank from hot steam and biomass.

2. Description of the Related Art

Such an apparatus is already previously known from DE 10 2011 001 108 A1. There, a hydrothermal carbonization reaction takes place in a reaction tank that is charged from a mixing tank or pre-heating tank. The mixing tank is connected with the reaction tank by way of a solids pump, which conveys the biomass into the reaction tank after a pre-treatment, at a lower pressure and a lower temperature in comparison with the reaction conditions in the reactor. Such a mixing tank is designed for preparing more or less one batch, and then being emptied completely into the reactor.

The actual carbonization reaction then takes place in the reaction tank, under a pressure of about 25 bar and at temperatures from 210° C. to 230° C. In this regard, first the structures of the biomass are split up, in order to split the cellulose of the biomass into glucose within the scope of hydrolysis. Afterward, the actual carbonization takes place. In this regard, mixing of the biomass takes place, as does feed of hot steam, in order to increase the water proportion in the mixture and to form a slurry, in which the carbonization reaction can take place as effectively as possible. Finally, within the scope of the final condensation, the carbon components, which are water-soluble at first, combine to form larger molecules.

After the reaction, the earlier embodiment of the method provides for a buffer tank into which the slurry, which has reacted completely, is brought out of the reaction tank. There, the slurry is once again slowly cooled at a lower pressure level.

Ultimately, the method provides for converting biomass to biocoal, an energy source. In order to work as effectively as possible, as much energy as possible should be saved during the process. Furthermore, it is important to optimize the capacity utilization of the system, in order to work as effectively as possible in this regard, as well.

SUMMARY OF THE INVENTION

Against this background, it is an object of the present invention to further improve the energy balance and structure the method more effectively.

These and other objects are achieved, according to the invention, by an apparatus for conducting a hydrothermal carbonization reaction including a reaction tank, which is connected with a steam generator to receive hot steam, and connected with a mixing tank to receive biomass, by way of a feed pipe, and which is connected with a buffer tank to drain off a slurry that forms in the reaction tank from hot steam and biomass. The mixing tank is structured as a pulper, which has a first heat exchanger for giving off heat to the biomass contained in the pulper. The heat exchanger is connected with a second heat exchanger assigned to the buffer tank for absorbing heat from slurry drained out of the reaction tank into the buffer tank, to form a closed heat circuit. Further practical embodiments of such an apparatus are discussed below.

As the solution for the above problem, the apparatus according to the invention uses what is called a pulper in place of a simple mixing tank, which pulper is able to store and prepare a complete day's supply of biomass, more or less permanently, and thereby to fill a reaction tank regularly. For this purpose, the biomass is already heated and mixed in the pulper, and preferably, hot steam is also already mixed in here, so that the slurry already occurs in the pulper and therefore can be pumped into the reaction tank very easily and quickly. This arrangement reduces the standing times that were previously required for transport of the biomass into the reaction tank using a solids pump.

Above all, however, the use of a first heat exchanger, which is integrated into the pulper, is particularly advantageous. This heat exchanger forms a heat circuit together with a second heat exchanger, which is integrated into the buffer tank and absorbs heat there from the slurry that has been drained from the reactor and has completely reacted. The heat absorbed in the buffer tank is transported to the pulper by way of the heat circuit and absorbed by the biomass there. The heat carrier, which cools off again as a result, is passed back to the second heat exchanger in the buffer tank and there cools the slurry again, which transfers its heat to the heat carrier.

A heat circulation is formed as a result, in which the cooling slurry transfers its heat to the biomass that is to be heated up, and thereby continuously keeps energy in the system, once it has been fed into the system. Furthermore, in order to be able to intervene from the outside, in addition, at least one further heat exchanger can be provided in the heat circuit, by way of which heat can be fed into or withdrawn from the heat circuit in targeted manner.

Such heat exchangers can be implemented in different ways. One possibility surrounds the respective tank with a double-walled outer sheath. The hollow chamber that forms between the two outer walls in this manner can then have heat carrier medium flowing through it, and either receive or give off heat from the inner one of the two walls, depending on the location of use. If the pulper additionally possesses a stirring mechanism, it can be practical to guide the heat carrier in a countercurrent to the flow in the biomass that results from mixing.

In this regard, it can be practical to apply an insulation layer on the pulper and on the buffer tank, on the outside, in order to reduce heat losses that result from radiation from the heat carrier medium.

Alternatively or supplementally, the respective tank can have one or more heat exchanger coils passing through it, which run through the interior of the respective tank or surround it, and possess the greatest possible surface area on the basis of windings and spirals. In the case of the heat exchanger in the buffer tank, the coil would be a cooling coil; in the case of the heat exchanger in the pulper, the coil would be a heating coil. A particularly suitable heat carrier is thermal oil, which is preferably used in the heat circuit.

The pulper, however, does not have to obtain its heat from the buffer tank exclusively by way of the heat circuit. Particularly when starting the system up, when no slurry is available for cooling as yet, other sources are required for heating the pulper.

One step ahead of the buffer tank, excess heat is available from the reaction tank, which has not only the feed pipe for supplying the slurry but also a gas pipe by way of which it is connected with the pulper. In the case of a high pressure in the reaction tank, excess gas, called purge gas, in other words cleaning gas, can be discharged from the reaction tank by way of this pipe; this gas is brought into the pulper and raises the temperature there.

Initially, however, heating in the pulper must take place by way of connecting the pulper with a steam generator. Ideally, this steam generator can be the same steam generator that also supplies the reaction tank. The major portion of the energy required for heating the biomass in the pulper is made available by supplying hot steam to the pulper.

Heating of the biomass in the pulper to its operating temperature of around 90° C. can furthermore be made more uniform in that means for mixing biomass and hot steam are assigned to the pulper. Such means can be stirring mechanisms and mixing mechanisms of different types, for example arrangements of mixing nozzles or also a mechanical stirring mechanism having one or more stirring arms. Particularly preferably, an asymmetrical stirring mechanism can be used, which ensures that the biomass is not just moved in a circle but rather also forms turbulent flows. In the case of placement of mixing nozzles in the pulper, the purge gas from the reaction tank, in particular, can be brought into the pulper, and thereby the energy of the reaction tank can contribute both to heating and to mixing the biomass.

Supply of hot steam to the pulper furthermore allows liquefaction of the biomass, so that the biomass no longer has to be brought into the reaction tank using a solids pump, but rather can be conveyed by means of a centrifugal pump, for example. This arrangement allows clearly faster charging of the reaction tank and thereby reduces the standing time of the apparatus between two batches. Furthermore, the centrifugal pump also represents a cost-advantageous alternative to the solids pump.

In a concrete embodiment of the pulper, the pulper can possess a funnel-shaped bottom, by way of which heavy components are separated from the biomass. Sand and sludge will settle at the bottom, and the settled sand and sludge are discharged from the pulper by way of a drain opening at the funnel tip, in the direction of a sand separator.

Finally, it is practical, in the sense of ideal capacity utilization, to connect multiple reaction tanks with a common pulper. In this way, filling of the next reaction tank can start during the reaction time of a first reaction tank, until the first reaction tank is emptied again and its charging with biomass can begin once again. Preferably, about six reaction tanks are served by a pulper in this manner. The same also holds true for the buffer tanks; preferably, two buffer tanks will receive the completely reacted slurry of the six reaction tanks, alternately to one another.

Furthermore, it can be useful in practical implementation not to produce the pulper and/or the buffer tank as an individual construction, but rather, instead, to combine multiple tanks that communicate with one another to form a pulper or a buffer tank. In particular, tanks that can be acquired at a low price can be combined to form a tank arrangement in this way, instead of building an expensive and particularly large special tank.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
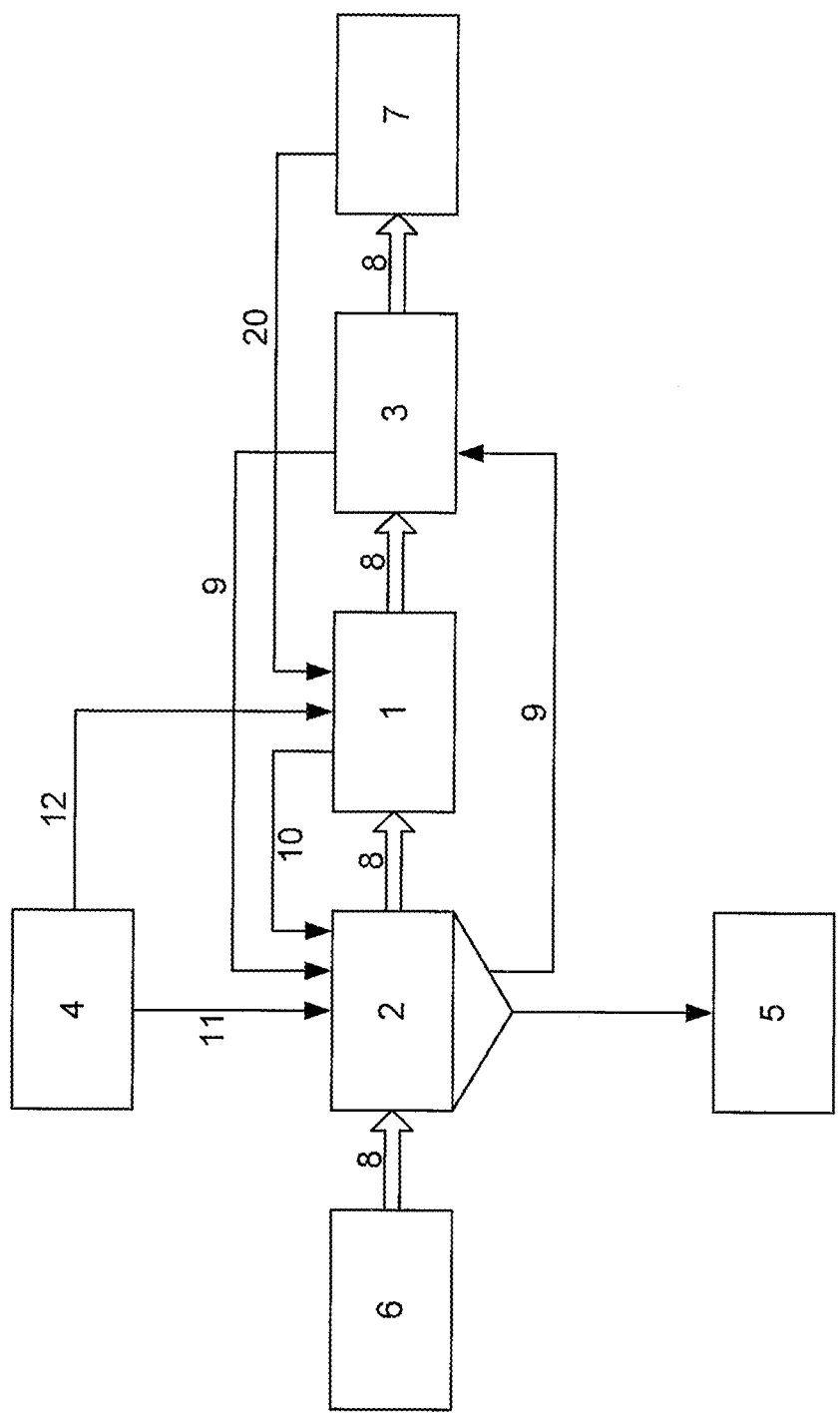
FIG. 1 is a schematic representation of the method of functioning of an apparatus according to the invention.

FIG. 1, in a schematic representation, shows a reaction tank 1 disposed in the center of the diagram. This tank is connected with a pulper 2 by way of a feed pipe 8, which pulper charges the reaction tank 1 with pre-treated, liquefied biomass. The biomass in the pulper 2 comes from a bunker 6, in which large amounts of biomass are kept on hand. A conveying unit and an impurity separator, particularly a metal separator, which prepares the biomass for the pulper 2, are situated between the bunker 6 and the pulper 2.

The demand for one day's operation of all the reaction tanks 1 connected with the pulper 2, in each instance, is brought into the pulper 2 by way of a feed pipe 8, and kept on hand there, with heated biomass that has been called up being immediately replaced by new, cold biomass from the bunker 6.

Hot steam is blown into the pulper 2 by way of a steam generator 4, which is connected with the pulper 2 by way of a steam pipe 11; the steam heats the biomass contained in the pulper 2, for one thing, and adds water, for another thing, in order to liquefy the biomass to form a slurry.

Using an asymmetrical stirring mechanism, not shown here, the slurry is mixed in the pulper 2, so that uniform heating is guaranteed, and the most homogeneous mixture possible is formed. Sand and sludge from the biomass will settle in the bottom region of the pulper 2. These settled materials can be drained into a sand separator 5.

To save heat energy, the reaction tank 1 will give off what is called purge gas directly into the pulper 2 in the case of excessive pressure, by way of a gas pipe 10, so that the energy that escapes from the reaction tank 1 is retained in the system. The reaction tank is also supplied by the steam generator 4 by way of a steam pipe 12, in order to generate the temperature required in the reaction tank 1, the required water, and the required pressure, and thereby to create the reaction conditions for hydrothermal carbonization.

After the reaction in the reaction tank 1, the slurry, with the carbonized biomass, is drained into the buffer tank 3 by way of a further feed pipe 8; this draining can take place by way of at least partial pressure equalization between reaction tank 1 and buffer tank 3. Because of the pressure gradient between the two tanks 1 and 3, the slurry is drawn into the buffer tank very quickly in this manner, and can subsequently cool off there.

After cooling, the slurry gets to follow-up processing 7 by way of a further feed pipe 8. During the course of further methods, not considered in detail here, process water 20 separated from the slurry can be returned or recirculated to the reaction tank 1, where a further reaction with the organic freights of the process water that are still contained in it can be carried out. Furthermore, in this way the process water is used in the process once again and does not have to be replaced with fresh water.

In total, the result is that the slurry heats up in the pulper 2 and in the reaction tank 1, and is cooled down in the buffer tank 3. The heat of the slurry in the buffer tank 3 can be transferred to the biomass in the pulper 2 by means of heat exchangers in the two tanks 2 and 3, which form a heat circuit 9 between these two tanks 2 and 3, so that less energy can escape from the system. This heat energy transferred to the pulper 2 contributes to less hot steam being required in order to keep the pulper 2 at the required temperature.

Figure 2:
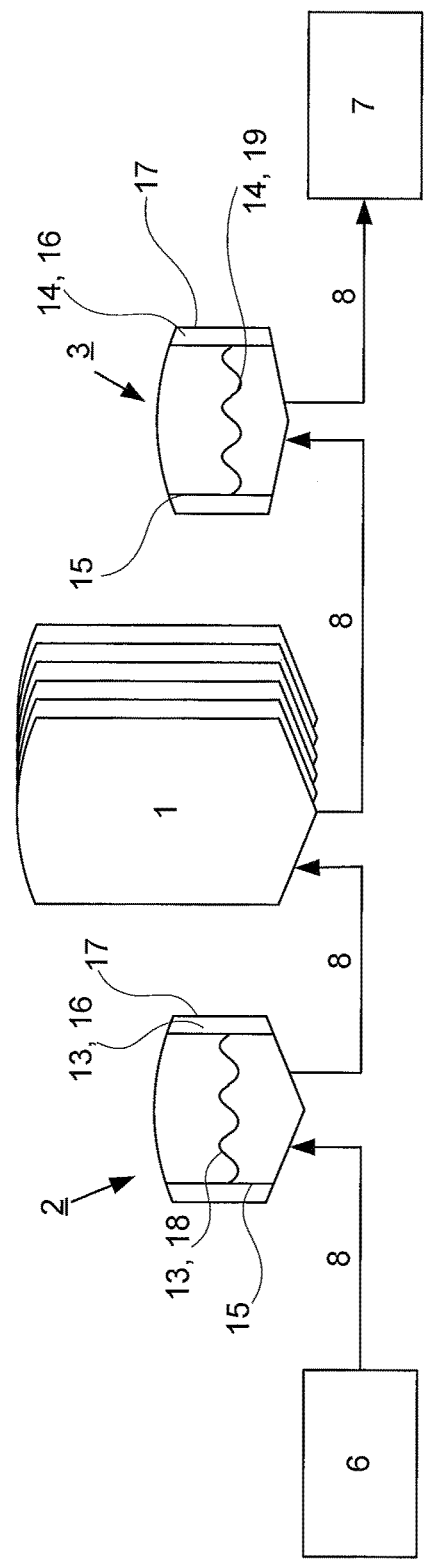
FIG. 2 is a schematic representation of the heat circuit as well as of the slurry feed.

FIG. 2 shows a further schematic diagram in which possible heat exchangers 13 and 14 are shown. For one thing, the possibility exists of configuring an outer sheath 15 of the tanks 2, 3 with a double wall. In this way, a hollow chamber 16 forms between the two walls, which chamber can be covered on the outside with an insulation layer 17 in order to prevent heat losses.

A first heat exchanger 13 in the pulper 2 gives off the heat previously absorbed, by way of the inner wall of the double-walled outer sheath 15, and thereby heats the slurry contained in the pulper 2 when it makes contact with the inner wall in question. In addition, the pulper 2 has a heating coil 18 that passes through the pulper 2 and gives off heat to the slurry in the interior of the pulper, as well.

A second heat exchanger 14 in the buffer tank 3 fundamentally works in precisely the opposite way while having the same structure; there the heat carrier that is conducted in the heat circuit 9 absorbs heat from the cooling slurry and transports it to the pulper 2 through the heat circuit 9. Accordingly, the heat transfer coil also functions as a cooling coil 19 here.

What has been described above is therefore an apparatus for conducting a hydrothermal carbonization reaction, which is able to improve the energy balance by means of the use of heat exchangers and the transport of heat through the system, and to structure the method to be more effective by means of already pre-heating and liquefying the biomass in the pulper.

Although at least one embodiment of the present invention has been shown and described, it is to be understood that many changes and modifications may be made thereunto without departing from the spirit and scope of the invention.

What is claimed is:

1. An apparatus for conducting a hydrothermal carbonization reaction comprising:
    (a) a steam generator;
    (b) a mixing tank;
    (c) a buffer tank; and
    (d) a reaction tank connected with the steam generator to receive hot steam and connected with the mixing tank by way of a feed pipe to receive biomass and connected with the buffer tank to drain off a slurry formed in the reaction tank from the hot steam and the biomass;
    wherein the mixing tank is structured as a pulper and forms a closed heat circuit comprising a first heat exchanger for giving off heat to the biomass contained in the pulper and a second heat exchanger connected with the first heat exchanger and associated with the buffer tank for absorbing the heat from the slurry drained out of the reaction tank into the buffer tank;
    wherein thermal oil is conducted in the heat circuit as a heat carrier;
    wherein the at least one of the pulper and the buffer tank is surrounded by at least one heat exchanger coil or wherein at least one heat exchanger coil passes through the pulper or the buffer tank; and
    wherein at least one third heat exchanger is associated with the heat circuit for withdrawing heat from the heat circuit or for feeding heat into the heat circuit in a targeted manner.

2. The apparatus according to claim 1, wherein the pulper is connected with the reaction tank not only by the feed pipe but also by a gas pipe for charging the pulper with cleaning gas that has been drained from the reaction tank.

3. The apparatus according to claim 1, wherein the pulper is connected with the steam generator to supply hot steam by way of a steam pipe.

4. The apparatus according to claim 3, wherein the pulper has a mixer for mixing the biomass and the hot steam.

5. The apparatus according to claim 4, wherein the mixer comprises at least one of an asymmetrical stirrer and a mixing nozzle arrangement.

6. The apparatus according to claim3, further comprising a centrifugal pump associated with the feed pipe between the pulper and the reaction tank.

7. The apparatus according to claim 5, further comprising a centrifugal pump associated with the feed pipe between the pulper and the reaction tank.

8. The apparatus according to claim 1, wherein the pulper has a funnel-shaped bottom for allowing sand and sludge to settle, wherein an outlet associated with a funnel tip is connected with a sand separator.

9. The apparatus according to claim 1, further comprising a plurality of parallel reaction tanks associated with the pulper.

10. The apparatus according to claim 1, wherein at least one of the pulper and the buffer tank is produced, from a plurality of tank units that communicate with one another.

11. The apparatus according to claim 10, wherein the plurality of tank units are of an identical type.

\* \* \* \* \*